United States Patent

Mangum et al.

[11] Patent Number: 6,120,058
[45] Date of Patent: *Sep. 19, 2000

[54] AIR BAG INFLATOR

[75] Inventors: Michael G. Mangum, Mesa; Jerome W. Emery; David D. Ryder, both of Gilbert, all of Ariz.

[73] Assignee: TRW Vehicle Safety Systems Inc., Lyndhurst, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/702,838

[22] Filed: Aug. 23, 1996

[51] Int. Cl.$^7$ .................................................. B60R 21/28
[52] U.S. Cl. ........................ 280/741; 280/736; 149/19.7
[58] Field of Search .................................. 280/941, 736, 280/737; 149/19.7, 19.4, 19.5, 19.6

[56] References Cited

U.S. PATENT DOCUMENTS

| | | |
|---|---|---|
| 3,663,036 | 5/1972 | Johnson . |
| 3,665,217 | 5/1972 | Johnson . |
| 3,715,131 | 2/1973 | Hurley et al. . |
| 3,756,621 | 9/1973 | Lewis et al. . |
| 3,758,131 | 9/1973 | Stephenson et al. . |
| 3,788,667 | 1/1974 | Vancil . |
| 3,910,595 | 10/1975 | Katter et al. . |
| 3,966,226 | 6/1976 | Roth . |
| 4,018,457 | 4/1977 | Marlow . |
| 4,379,007 | 4/1983 | Fifer et al. ................................. 149/92 |
| 5,022,674 | 6/1991 | Frantom et al. ......................... 280/737 |
| 5,062,365 | 11/1991 | Canterberry . |
| 5,125,684 | 6/1992 | Cartwright . |
| 5,160,163 | 11/1992 | Castagner et al. . |
| 5,263,740 | 11/1993 | Frey et al. . |
| 5,280,672 | 1/1994 | Frey et al. . |
| 5,388,859 | 2/1995 | Fischer et al. ........................... 280/737 |
| 5,507,891 | 4/1996 | Zeigler . |
| 5,553,889 | 9/1996 | Hamilton et al. . |
| 5,589,141 | 12/1996 | Sides et al. . |
| 5,602,361 | 2/1997 | Hamilton et al. . |
| 5,616,883 | 4/1997 | Hamilton et al. . |
| 5,627,337 | 5/1997 | Hamilton et al. . |
| 5,630,618 | 5/1997 | Hamilton et al. . |
| 5,695,216 | 12/1997 | Sandstrom et al. ...................... 280/737 |
| 5,711,546 | 1/1998 | Hamilton et al. ........................ 280/736 |

FOREIGN PATENT DOCUMENTS

| | | |
|---|---|---|
| 0591119 | 4/1994 | European Pat. Off. . |
| 0673809 | 9/1995 | European Pat. Off. . |

*Primary Examiner*—Edward A. Miller
*Attorney, Agent, or Firm*—Tarolli, Sundheim, Covell, Tummino & Szabo L.L.P.

[57] ABSTRACT

An apparatus (10) for inflating an air bag includes a container (12) having a chamber (16) for holding an inert gas and an oxidizer gas under pressure. A body (20) of a combustible material is disposed in the container (12). The body (20) of combustible material comprises a non-metallic nitrogen containing compound, a thermoplastic polymer, and an oxidizer material. The oxidizer material is selected from the group consisting of an alkali metal nitrate, alkali-earth metal nitrate, ammonium perchlorate, alkali metal perchlorate, alkali-earth metal perchlorate, organo-ammonium nitrate, or ammonium dinitramide. An igniter (32) ignites the body (20) of combustible material to generate combustion products that mix with, and heat, the inert gas and the oxidizer gas. The body (20) of combustible material undergoes further combustion upon exposure to the oxidizer gas to yield an inflation fluid comprising the combustion products, the inert gas, and any unreacted oxidizer gas. A conduit directs the inflation fluid flow from the container (12) into an air bag. The apparatus produces unexpectedly low levels of CO, NO, $NO_2$, HCN and HCOH in the inflation fluid.

18 Claims, 4 Drawing Sheets

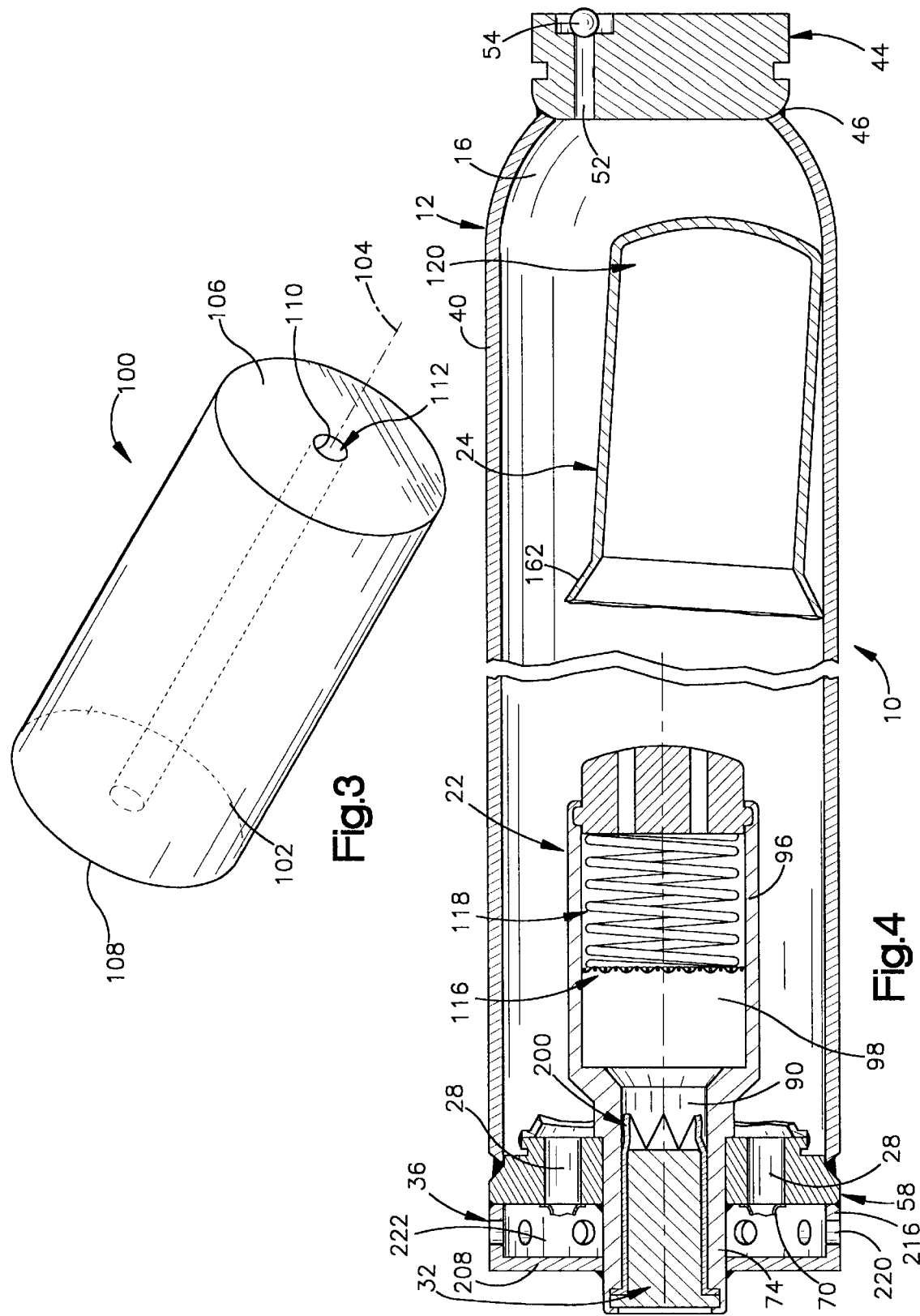

AIR BAG INFLATOR

FIELD OF THE INVENTION

The present invention relates to a hybrid inflator for inflating a vehicle occupant protection device.

BACKGROUND OF THE INVENTION

A hybrid inflator for inflating a vehicle occupant protection device includes a quantity of a stored gas and a body of combustible material. The stored gas typically comprises an inert gas and an oxidizer gas. The oxidizer gas helps to support the combustion of the body of combustible material. An igniter is actuatable to ignite the body of combustible material. As the body of combustible material burns, combustion products heat the inert gas. This increases the pressure of the inert gas. The heated inert gas and the combustion products form the inflation fluid.

SUMMARY OF THE INVENTION

The present invention relates to an apparatus for use in inflating a vehicle occupant protection device. The apparatus comprises a container, a supply of gas stored in the container, a combustible material, and igniter means for igniting the combustible material. The stored gas comprises an inert gas and an oxidizer gas. The combustible material comprises (a) a non-metallic nitrogen containing compound, (b) a thermoplastic polymer, and (c) an oxidizer selected from the group consisting of an alkali metal nitrate, alkali-earth metal nitrate, ammonium perchlorate, alkali metal perchlorate, alkali-earth metal perchlorate, organo-ammonium nitrate, and ammonium dinitramide. The combustible material, when ignited, burns in the presence of the oxidizer gas and generates combustion products including heat for heating the inert gas. The apparatus further comprises a conduit for directing the heated inert gas and the combustion products toward the vehicle occupant protection device.

BRIEF DESCRIPTION OF THE DRAWINGS

The foregoing and other objects and features of the present invention will become more apparent to one skilled in the art upon a consideration of the following description of the invention and the accompanying drawings in which:

FIG. 3 is an enlarged view of a part in FIG. 1;

FIG. 4 is a sectional view, generally similar to FIG. 1, illustrating the relationship between parts of the inflator of FIG. 1 after the inflator has been actuated;

DETAILED DESCRIPTION OF THE PRESENT INVENTION

Figure 1:
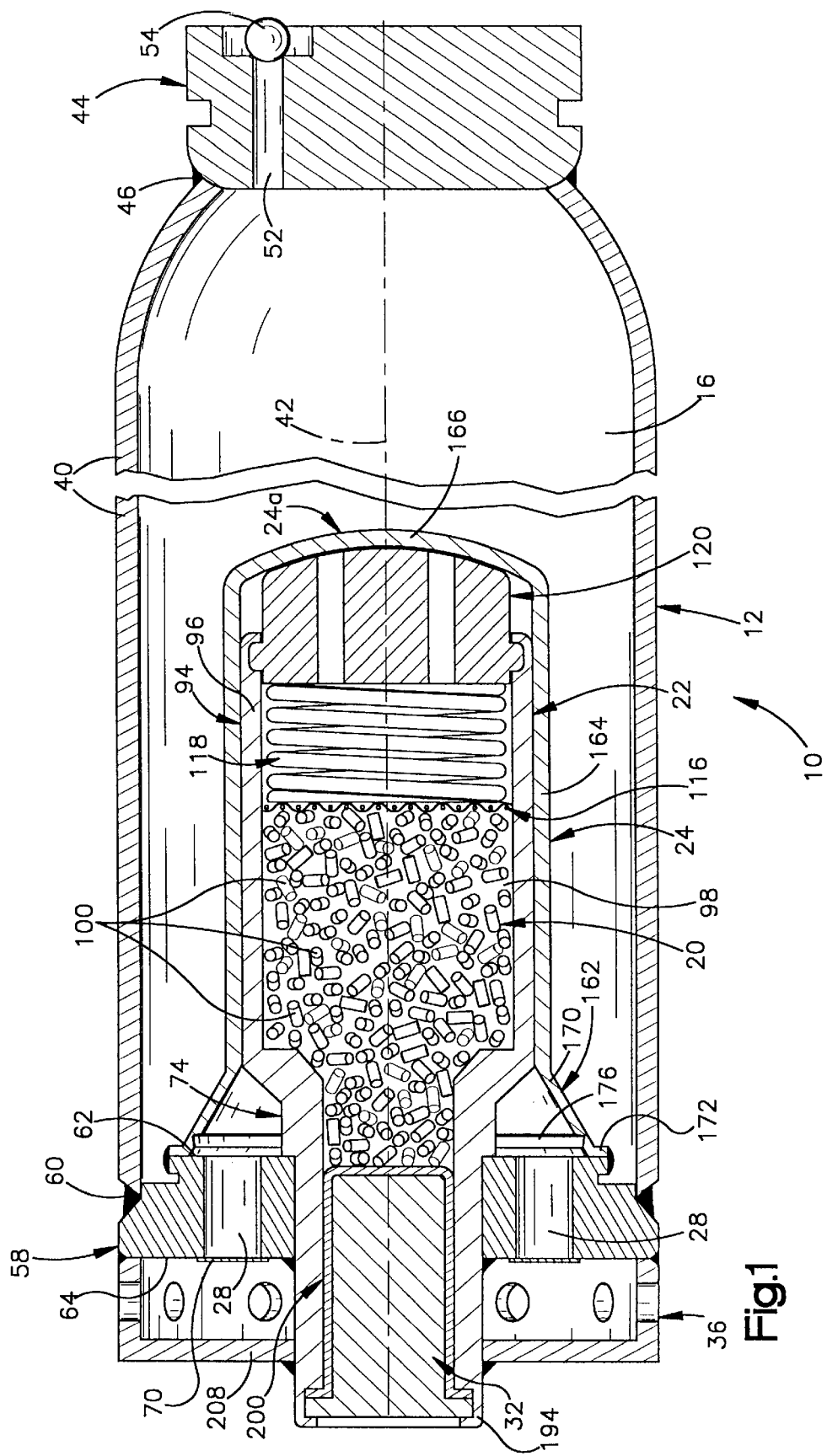
FIG. 1 is a sectional view of an inflator constructed in accordance with the present invention.

An inflator 10 (FIG. 1) provides inflation fluid for inflating a vehicle occupant protection device, such as an air bag (not shown). The inflator 10 includes a generally cylindrical container 12 having a chamber 16 which holds a supply of stored gases.

A cup shaped closure member 24 blocks gas flow from the chamber 16 through a plurality of discharge passages 28. The cup shaped closure member 24 has a closed end 24a and an opposite open end. A body 20 of combustible material is disposed in a housing 22. The body 20 of combustible material and the housing 22 extend into the cup shaped closure member 24. An igniter 32 is also disposed within the housing 22.

When an air bag is to be inflated, the igniter 32 is activated to ignite the body 20 of combustible material. Ignition of the body 20 of the combustible material creates heat and combustion products which apply pressure against the closed end 24a of the closure member 24. The pressure applied to the closed end 24a of the closure member 24 breaks the closure member and moves it away from the discharge passages 28, as shown in FIG. 4.

The container 12 (FIG. 1) includes a cylindrical one-piece steel side wall 40. The side wall 40 has a longitudinal central axis which is coincident with a longitudinal central axis 42 of the container 12. The container 10 also includes a one-piece circular steel end wall 44 which is connected with the right end (as viewed in FIG. 1) of the side wall 40 at an annular weld 46. A fill passage 52 is formed in the end wall 44 and is closed by suitable means such as a steel ball 54 welded in place. The circular end wall 44 is coaxial with the side wall 40. The central axis 42 of the container 12 extends through the center of the end wall 44.

A circular steel end wall 58 is connected with the left end (as viewed in FIG. 1) of the side wall 40 by an annular weld 60. The left end wall 58 is disposed in a coaxial relationship with the right end wall 44 and the side wall 40 of the container 12. The end wall 58 has parallel inner and outer, radially extending side surfaces 62 and 64. Inner side surface 62 is presented toward the interior of the container 12, while the outer side surface 64 is presented away from the interior of the container. The weld 60 connects the left end (as viewed in FIG. 1) of the side wall 40 with the end wall 58 at a location intermediate to the inner and outer side surfaces 62 and 64.

The discharge passages 28 are formed in the end wall 58 and have cylindrical configurations with central axes which extend parallel to the central axis 42 of the container 12. The discharge passages 28 are arranged in an annular array about the central axis 42 of the container 12. Although only two discharge passages 28 are shown in FIG. 1, it should be understood that there are more than two discharge passages formed in the end wall 58. The number and arrangement of the discharge passages 28 can vary as desired.

An annular metal foil seal 70 is secured by a suitable adhesive to the outer side surface 64 of the end wall 58 across the ends of each of the discharge passages 28. The seal 70 blocks the conduction of moisture from the environment around the inflator assembly 10 through the discharge passages 28.

The housing 22, which encloses the body 20 of combustible material, has a central axis which is coincident with the central axis 42 of the container 12. The housing 22 includes a tubular base section 74 (FIG. 2) which extends through the end wall 58 of the container 12. The base section 74 is generally circular in transverse section. An annular, radially extending shoulder 76 on the outer surface of the base section 74 abuts the inner side surface 62 of the end wall 58. An annular weld 80 connects the base section 74 of the housing 22 with the outer side surface 64 of the end wall 58.

Figure 2:
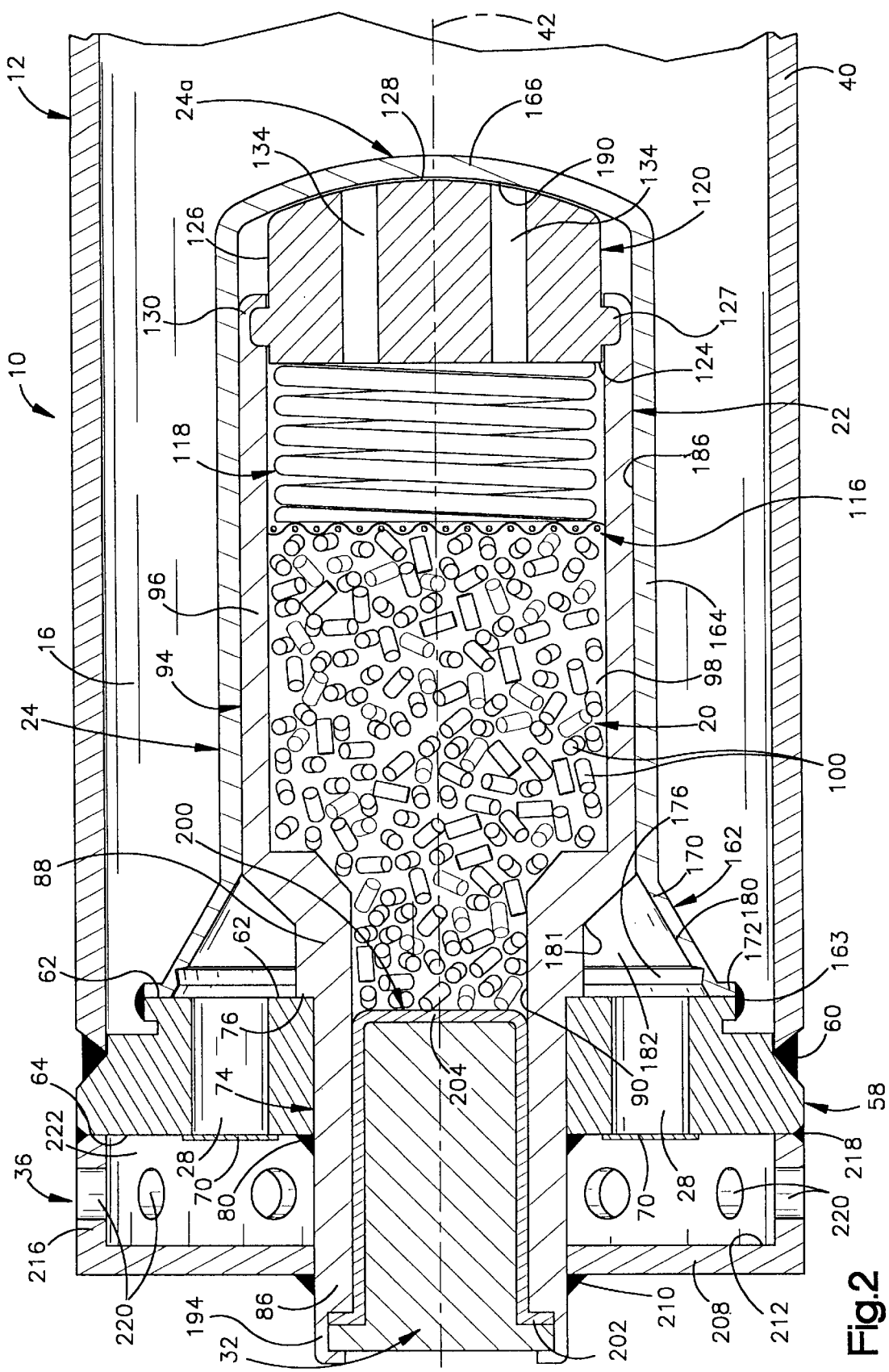
FIG. 2 is an enlarged fragmentary sectional view of a portion of the inflator of FIG. 1.

The base section 74 of the housing 22 has a cylindrical outer end portion 86 which extends axially outward, that is, away from the interior of the container 12 and toward the left as viewed in FIG. 2, from the end wall 58. An inner end portion 88 of the base section 74 extends axially inward, that is, toward the interior of the container 12 and to the right as viewed in FIG. 2, from the end wall 58. A cylindrical passage 90 extends through the center of the base section 74. The igniter 32 is located in the passage 90.

A tubular main section 94 of the housing 22 is formed as one piece with the base section 74. The main section 94 of the housing 22 includes a cylindrical side wall 96. The side wall 96 and base section 74 have central axes which are coincident with the central axis 42 of the container 12. The cylindrical side wall 96 has a relatively large outer diameter. Therefore, the base section 74 flares radially outward to the side wall 96 of the main section 94 of the housing 22.

The main section 94 of the housing 22 has a cylindrical housing chamber 98 (FIG. 2). The housing chamber 98 has a central axis which is coincident with the central axis 42 of the container 12.

A retainer 116 is disposed within the chamber 98 adjacent to the body 20 of combustible material. A spiral spring 118 is disposed within the chamber 98 adjacent to the retainer 116 and on a side of the retainer opposite the body 20 of combustible material. A strainer 120 is disposed within the chamber 98 between the spring 118 and the closed end 24a of the closure member 24. The retainer 116 is a thin circular-shaped mesh of metallic wire. The retainer 116 is urged by the spring 118 against the body 20 of combustible material to maintain the body 20 of combustible material in a packed arrangement.

The strainer 120 (FIG. 2) is preferably a powdered metal part. The strainer 120 has a flat, circular, radially extending inner side surface 124 which abuttingly engages one end of the spring 118 (FIG. 2). The strainer 120 also has cylindrical, axially extending side surface 126 which extends parallel to the central axis 42. The strainer 120 also has an annular, radially extending shoulder 127 on the cylindrical surface 126. The strainer 120 has a substantially circular outer side surface 128 which abuts the closed end 24a of the closure member 24. An annular crimp or rim 130 at the right end (as viewed in FIG. 2) of the cylindrical housing side wall 96 engages the shoulder 127 of the strainer 120 to hold the strainer in place in the housing 22.

A plurality of passages are provided in the strainer 120 to conduct combustion products, including heat, which are created upon ignition of the body 20 of combustible material. Specifically, the strainer 120 has four equally spaced cylindrical main passages 134 (two of which are shown in FIG. 2), which extend through the strainer 120. The passages 134 through the strainer 120 conduct combustion products from the body 20 of combustible material towards the closed end 24a of the closure member 24.

The closure member 24 (FIG. 2) blocks gas flow from the chamber 16 through the discharge passages 28 and encloses the main section 94 of the housing 22. The closure member 24, as discussed above, has a generally cup shaped configuration and is formed as one piece of a suitable material, such as low carbon steel or annealed stainless steel. The closure member 24 has a central axis which is coincident with the central axis 42 of the container 12.

The closure member 24 includes a skirt section 162 which is connected to the flat circular inner side surface 62 of the end wall 58 (FIG. 2). The closure member 24 has a cylindrical side wall 164 which is connected to and is coaxial with the skirt section 162. The side wall 164 encloses the main section 94 of the housing 22 and the body 20 of combustible material. An imperforate substantially circular end wall 166 of the closure member 24 is connected with the right end (as viewed in FIG. 2) portion of the side wall 164 and closes the end 24a of the cup shaped closure member. The end wall 166 extends across the right end (as viewed in FIG. 2) of the housing 22.

The skirt section 162 has a side wall 170 with a configuration which is a frustrum of a cone. An annular flange 172 extends radially outward from the left (as viewed in FIG. 2) end of the side wall 170 and is connected to the end wall 58 by weld 163. The annular flange 172 circumscribes and is disposed in a coaxial relationship with the annular array of inlet openings to the discharge passages 28.

The side wall 170 of the skirt section 162 extends from the main section 94 of the housing 22 to the inner side surface 62 of the end wall 58. In the embodiment of the invention illustrated in FIG. 2, the cylindrical main section 94 of the housing 22 has an outer surface which is located radially inward of the longitudinal axes of the individual discharge passages 28. Therefore, the skirt section 162 flares axially away and radially outward from the main section 94 of the housing 22 toward the end wall 58. However, it is contemplated that the main section 94 of the housing 22 could be formed with a somewhat larger diameter so that the skirt section 162 could be cylindrical and still circumscribe the annular array of discharge passages 28.

An annular frangible section 176 (FIG. 2) of reduced thickness is formed in the skirt section 162. The frangible section 176 is breakable under the influence of tension forces transmitted from the end wall 166 of the cup shaped closure member 24 upon ignition of the body 20 of combustible material. The frangible section 176 is coaxial with the central axis 42 of the container 12 and extends around the base section 74 of the housing 22.

The skirt section 162 (FIG. 2) has an inner side surface 180 which cooperates with the inner side surface 62 on the end wall 58 and an outer side surface 181 of the base section 74 to form an annular manifold chamber 182. The manifold chamber 182 extends around the base section 74 of the housing 22 and has a central axis which is coincident with the central axis 42 of the container 12. The discharge passages 28 in the end wall 58 have circular inner ends which open to the manifold chamber 182.

Prior to breaking of the frangible section 176 of the skirt section 162, the manifold chamber 182 is isolated from the supply of stored gas in the chamber 16. Thus, the fluid pressure in the manifold chamber 182, prior to breaking of the frangible section 176, will be approximately atmospheric pressure.

The tubular side wall 164 (FIG. 2) of the closure member 24 has a cylindrical inner side surface 186 which is disposed in engagement with a cylindrical outer side surface of the main section 94 of the housing 22. The inner side surface 186 of the side wall 164 is freely slidable along the outside of the housing 22 under the influence of gas pressure applied against the end wall 166 after ignition of the body 20 of combustible material and breaking of the frangible section 176 of the closure member 24.

The igniter 32, which is located in the passage 90 (FIG. 2) extending through the base section 74 of the housing 22, has a cylindrical configuration. The igniter 32 is axially aligned with the left end (as viewed in FIG. 2) of the body 20 of combustible material. An annular crimp or rim 194 at the left end (as viewed in FIG. 2) of the cylindrical outer end portion 86 of the base section 74 of the housing 22 engages an outer metal casing of the igniter 32 to hold the igniter in place in the housing 22. The igniter 32 includes a pyrotechnic charge which may be zirconium potassium perchlorate, titanium potassium perchlorate, or $BKNO_3$ or, if desired, a different chemical composition.

The igniter 32 is connected with a sensor assembly (not shown) which detects vehicle deceleration. If the sensor assembly detects vehicle deceleration of a magnitude requiring actuation of an air bag to protect a vehicle occupant, the sensor assembly completes an electrical circuit with an energy source. Completing the electrical circuit actuates the igniter assembly 32 to effect ignition of the body 20 of combustible material.

A one-piece seal cup 200 (FIG. 2) is disposed in the passage 90 and receives the igniter 32 to block the conduction of moisture to the body 20 of combustible material from the environment around the inflator assembly 10. The seal cup 200 is formed as a single piece of metal and has a thickness of between 0.20 and 0.30 millimeters. The seal cup 200 has an annular flange 202 which is connected with the outer or left (as viewed in FIG. 2) end of the base section 74 by the crimp 194. A plurality of score lines (not shown) extend diametrically across the right (as viewed in FIG. 2) end wall 204 of the seal cup 200. The score lines have a depth of approximately 0.05 to 0.10 millimeters. The score lines weaken the seal cup 200 so that it is easily ruptured upon activation of the igniter 32.

A diffuser 36 is formed from a single piece of steel and has a circular end wall 208 (FIG. 2). The diffuser end wall 208 is connected to the base section 74 of the housing 22 by an annular weld 210 and extends radially outward from the outer end portion 86 of the base section. The end wall 208 of the diffuser 36 has a central axis which is coincident with the central axis 42 of the container 12. A flat circular, radially extending inner side surface 212 on the end wall 208 extends parallel to and is spaced from the flat circular outer side surface 64 on the end wall 58.

A cylindrical side wall 216 (FIG. 2) of the diffuser 36 is formed as one piece with the end wall 208 and extends axially from the outer periphery of the end wall 208. The outer diameter of the cylindrical side wall 216 of the diffuser 36 is essentially the same as the diameter of the outer side surface 64 on the end wall 58. The cylindrical side wall 216 of the diffuser 36 is connected to the outer side surface 64 of the container end wall 58 by weld 218.

An annular array of radially extending cylindrical passages 220 is formed in the side wall 216 of the diffuser 36. The combined flow area of the passages 220 is larger than the combined flow area of the passages 28 in the end wall 58. The radially extending passages 220 are connected in fluid communication with an annular diffuser chamber 222 which is defined by the diffuser 36, the container end wall 58, and the base section 74 of the housing 22. The diffuser chamber 222 extends around the outer end portion 86 of the base section 74 of the housing 22. The diffuser passages 220 are also connected in fluid communication with the inside of an air bag (not shown).

The housing 22, closure member 24, and diffuser 36 are all connected with the end wall 58 of the container 12. By connecting the housing 22, closure member 24 and diffuser 36 to the end wall 58, these components of the inflator assembly 10 can be mounted as a unit on the side wall 40 of the container. The igniter 32 can be connected to the housing 22 after the end wall 58, housing 22, closure member 24 and diffuser 36 have been connected as a unit with the side wall 40 of the container 12.

In a preferred embodiment, the body 20 of combustible material comprises a plurality of randomly oriented cylindrical grains 100 disposed within the chamber 98 and part of the passage 90. Each of the grains 100 may be similar or identical in configuration.

The configuration of a typical grain 100 is shown in detail in FIG. 3. The grain 100 has a cylindrical outer surface 102 centered on an axis 104. The grain 100 further has first and second opposite side surfaces 106 and 108. Each of the opposite side surfaces 106 and 108 has a circular shape centered on the axis 104, and is generally perpendicular to the axis 104.

The grain 100 preferably has a cylindrical inner surface 110, which defines a respective cylindrical passage 112 extending axially through the grain 100. Although the grain 100 is shown in the preferred embodiment as having one passage 112, it is contemplated that the grain 100 may have a plurality of passages which may vary in arrangement and diameter. For instance, in addition to the cylindrical passage 112, the grain 100 may also have eighteen other passages extending through the grain.

Although the body 20 of combustible material has been illustrated as being a plurality of randomly oriented cylindrical grains 100, it is contemplated that the body 20 of combustible material could be formed with a different configuration if desired. For instance, the body 20 of combustible material may have a multi-lobe cross-sectional configuration or may comprise a plurality of stacked cylinders.

The body 20 of combustible material contains a quantity of a non-metallic nitrogen containing compound. The non-metallic nitrogen containing compound is a material capable of undergoing rapid and substantially complete oxidation. The preferred non-metallic nitrogen containing compound is a smokeless powder such as is used in the manufacture of explosives and ammunition. The non-metallic nitrogen containing compound may be a material utilized in a low vulnerability ammunition ("LOVA").

The non-metallic nitrogen containing compound is preferably a material selected from the group consisting of nitroguanadine, triaminoguanadinenitrate, ethylene dinitramine, ethylenediamine dinitrate, 1,3,3-trinitroazetidine, cyclotrimethylenetrinitramine, cyclotetramethylenetetranitramine, trinitrotoluene, 2,4,6-trinitrophenylmethylnitramine and pentaerythritol tetranitrate and mixtures thereof. Preferably, the non-metallic nitrogen containing compound is cyclotrimethylenetrinitramine (RDX). A second preferred non-metallic nitrogen containing compound is cyclotetramethylenetetranitramine (HMX). The non-metallic nitrogen containing compound is a solid at 20° C.

The non-metallic nitrogen containing compound is present in the body 20 of combustible material in an amount of about 36% to about 76% by weight based on the weight of the body 20 of combustible material, excluding inert components. Preferably, the non-metallic nitrogen containing compound is present in the body 20 of combustible material in an amount of about 50% by weight based on the weight of the body 20 of combustible material, excluding inert components.

The body 20 of combustible material also includes a solid oxidizer material. The oxidizer enhances the combustion of the body 20 of combustible material and reduces the production of toxic gases such as carbon monoxide (CO), hydrogen cyanide (HCN), and oxides of nitrogen ($NO_x$). Suitable oxidizer materials include an alkali metal nitrate, alkali-earth metal nitrate, ammonium perchlorate, alkali metal perchlorate, alkali-earth metal perchlorate, organo-ammonium nitrate, or ammonium dinitramide. Suitable alkali metals include, but are not limited to, lithium, sodium, potassium, rubidium, and cesium. Suitable alkaline-earth metals include, but are not limited to, magnesium, calcium, strontium, and barium. Suitable organo-ammonium nitrates include, but are not limited to, tetramethylammonium nitrate, hydroxylammonium nitrate, and tetraalkylammonium nitrate.

The oxidizer material is present in the body 20 of combustible material in an amount of about 1% to about 40% by weight based on the weight of the body 20 of combustible material, excluding inert components. Preferably, the oxidizer material is present in the body 20 of combustible material in an amount of about 30% by weight based on the weight of the body 20 of combustible material, excluding inert components.

The body 20 of combustible material also includes a thermoplastic polymer binder material which is mixed with the non-metallic nitrogen containing compound and the oxidizer material to provide an intimate mixture. The binder material is mixed with the non-metallic nitrogen containing compound and the oxidizer material to obtain a moldable or extrudable plastic mass.

Suitable binder materials include cellulose acetate butyrate, cellulose acetate, polyester elastomers, polyether elastomers, polyurethanes, or copolymers of these polymers in any useful ratio. Preferably, the thermoplastic polymer binder material is cellulose acetate butyrate.

The thermoplastic polymer binder material is present in the body 20 of combustible material in an amount of about 8% to about 22% by weight based on the weight of the body 20 of combustible material, excluding inert components. Preferably, the thermoplastic polymer binder material is present in the body 20 of combustible material in an amount of about 12% by weight based on the weight of the body 20 of combustible material, excluding inert components.

The body 20 of combustible material may also include a non-energetic plasticizer. Any non-energetic plasticizer typically employed in the manufacture of low vulnerability ammunition may be used. Suitable non-energetic plasticizers include, but are not limited to, tributylcitrate, acetyltriethylcitrate, aretyltributylcitrate, alkylcitrates, alkylesters, arylesters, and alkylarylesters. Preferably, when a non-energetic plasticizer is used, it is desirable that the non-energetic plasticizer be tributylcitrate or acetyltriethylcitrate.

When a non-energetic plasticizer is used, it is further desirable that the non-energetic plasticizer be present in the body 20 of combustible material in an amount of no more than about 12% by weight based on the weight of the body 20 of combustible material, excluding inert components. Preferably, the non-energetic plasticizer is present in the body 20 of combusted material in an amount of about 7.6% by weight based on the weight of the body 20 of combustible material, excluding inert components.

The body 20 of combustible material may also include an energetic plasticizer. Any energetic plasticizer typically employed in the manufacture of low vulnerability ammunition may be used. Suitable energetic plasticizers include, but are not limited to, glycidyl azide polymer, alkylnitratoethylnitramines (wherein the alkyl chain can be methyl, ethyl, propyl, or butyl), bis-nitropropylformal, and 1-5-diazido-3-nitrazapentane. When an energetic plasticizer is used, it is desirable that the energetic plasticizer be present in the body 20 of combustible material in an amount of no more than about 12% by weight based on the weight of the body 20 of combustible material, excluding inert components.

The body 20 of combustible material may also include a quantity of nitrocellulose (containing between 11% to 13.4% nitrogen) for use as a binder. When nitrocellulose is used, it is desirable that the nitrocellulose be present in the body 20 of combustible material in an amount of no more than about 8% by weight based on the weight of the body 20 of combustible material, excluding inert components.

The body 20 of combustible material may also include stabilizers to provide heat aging (service life) stability. Suitable stabilizers include ethyl centralite and n-methyl paranitroaniline. When stabilizers are used, it is desirable that the stabilizer be present in the body 20 of combustible material in an amount of no more than about 4% by weight based on the weight of the body 20 of combustible material, excluding inert components. Preferably, ethyl centralite is present in the body 20 of combustible material in an amount of about 0.4% based on the weight of the body 20 of combustible material, excluding inert compounds.

The supply of gas is stored in the chamber 16 at a pressure of approximately 2,000 to 3,500 psi. The stored gas 30 is preferably stored in the container 16 at a pressure of approximately 1000 psi to about 5,000 psi, preferably about 3,000 psi to about 3,500 psi. The supply of stored gases in the chamber 16 comprises a mixture of one or more inert gases and at least one oxidizer gas.

The preferred inert gases are helium (He) and argon (Ar). Preferably, the inert gases comprise a mixture of argon and helium, with helium being present in an amount sufficient to act as a leak detector.

The oxidizer gas is any gas capable of oxidizing the body 20 of combustible material and its combustion products to produce essentially non-toxic combustion products. Preferably, the oxidizer gas is oxygen ($O_2$). The oxygen is preferably the only gas other than the inert gases present in the supply of stored gases.

Preferably, the stored gas comprises, on a weight basis, 10% to 25% oxygen, 1% to 5% helium, with the balance being argon. The most preferred composition of the stored gas is 75% argon, 20% oxygen, and 5% helium.

Upon the occurrence of sudden vehicle deceleration of a magnitude requiring air bag inflation, the deceleration sensor assembly completes an electrical circuit to activate the igniter 32 (FIG. 2) in a known manner. This results in ignition of the pyrotechnic charge in the igniter 32. Burning of the pyrotechnic charge in the igniter 32 generates hot gas which ruptures the relatively thin seal cup 200.

Rupturing the seal cup 200 enables hot gases from the burning ignition charge to flow through the passage 90 in the base section 74 of the housing 22. The hot gases engage the left end portion (as viewed in FIG. 2) of the body 20 of combustible material. The hot gases ignite the body 20 of combustible material to produce initial combustion products, including fundamental gases (i.e., carbon monoxide, carbon dioxide ($CO_2$), water ($H_2O$), hydrogen cyanide, oxides of nitrogen, formaldehyde (HCOH), Methane ($CH_4$), etc.) and a first quantity of heat.

Upon ignition of the body 20 of combustible material, the initial combustion products are conducted through the strainer 120 of the housing 22. The initial combustion products apply pressure against the end wall 166 of the closure member 24. The pressure applied against the end wall 166 of the closure member 24 results in the transmission of tensile forces through the side wall 164 of the closure member to the skirt section 162 of the closure member. These tensile forces are effective to break the frangible section 176 (FIG. 2) of the skirt section 162.

Upon breaking of the frangible section 176 of the skirt section 162, the pressure applied by the initial combustion products from the burning body 20 of combustible material moves the closure member 24 away from the end wall 58 of the container 12 toward the opposite end wall 44 (see FIG. 4). Thus, the pressure applied against the end wall 166 (FIG. 2) of the closure member 24 moves the closure member toward the right (as viewed in FIG. 2). This movement of the closure member 24 is initially guided by sliding movement of the side wall 164 of the closure member along the side wall 96 of the housing 22. The closure member 24 then separates from the housing 22 and comes to rest adjacent to the end wall 44 of the container 12 (FIG. 4). The strainer 120, the spring 118, and the retainer 116 are retained in the housing 22 by the crimp 130.

As soon as the frangible section 176 in the skirt section 162 (FIG. 2) breaks, the initial combustion products from the body 20 of combustible material mix with and heat the stored gases in the chamber 16. Any partially combusted initial combustion products (i.e, carbon monoxide, hydrogen cyanide, etc.) of the combustible material 20 further combust in the presence of the oxidizer gas to form an essentially non-toxic subsequent combustion product and a second quantity of heat. The first quantity of heat and the second quantity of heat increase the temperature of the supply of stored gases in the chamber 16, including the inert gas. An air bag inflation fluid comprising the heated inert gas, the combustion products, and any remaining heated oxidizer gas flows into the annular manifold chamber 182. The pressure from the inflation fluid transmitted from the manifold chamber 182 through the discharge passages 28 ruptures the seal 70 (FIGS. 2 and 4). The inflation fluid then flows from the chamber 16 through the discharge openings 28 into the diffuser chamber 222.

When the inflation fluid enters the diffuser chamber 222, it impinges against the end wall 208 of the diffuser 36. The end wall 208 of the diffuser 36 directs the inflation fluid flow radially outward toward the openings 220 in the side wall 216 of the diffuser 36. The inflation fluid flows through the openings 220 to the air bag. The openings 28 and the diffuser 36 thus comprise a conduit for directing the inflation fluid into the air bag. The air bag is thus inflated to the desired volume by the inflation fluid.

An advantage to using the quantity of non-metallic nitrogen containing compound to generate heat is that metallic by-products are not produced. The combustion products produced by the ignition of the non-metallic nitrogen containing compound are relatively smokeless. Thus, the inflator 10 does not require a filter. Also, the inert gases have relatively low specific heats. Thus for a given quantity of the non-metallic nitrogen containing compound, a relatively high pressure change in the inert gas may be obtained. The inert gases are also non-reactive when heated by the ignited non-metallic nitrogen containing compound.

An advantage to having a quantity of a solid oxidizer material in the body 20 of combustible material in combination with a quantity of oxygen gas stored in the chamber 16 is that the body 20 of combustible material can undergo substantially complete combustion, producing an inflation fluid essentially free of harmful levels of toxic gases. The solid oxidizer material in the body 20 of combustible material ensures an initial combustion of the body 20 of combustible material in the chamber 98 which produces a gaseous combustion product consisting essentially of fundamental gases instead of larger organic molecules.

The oxidizer gas in the chamber 16 is necessary to combust further the partially combusted fundamental gases, including the toxic gases, to stable non-toxic gases. It is believed that the hydrogen cyanide further combusts in the presence of the oxidizer gas to nitrogen ($N_2$) and carbon dioxide. It is believed that some of the nitric oxide (NO) further combusts in the presence of the oxidizer gas to nitrogen and oxygen. It is believed that some of the nitric oxide further combusts in the presence of the carbon monoxide gas to nitrogen and carbon dioxide. It is believed that some of the nitrogen dioxide ($NO_2$) further combusts in the presence of the oxidizer gas to nitrogen and oxygen. It is believed that some of the nitrogen dioxide further combusts in the presence of the carbon monoxide gas to nitrogen and carbon dioxide. It is believed that the methane further combusts in the presence of the oxidizer gas to carbon dioxide and water.

The following Examples illustrate the present invention.

Examples of typical weight percentages of compositions of propellants which are useful in the present invention are designated OML 1 through OML 16 and are summarized below in Table 1. A prior art composition of an inflator propellant is designated M-39 LOVA and is also summarized below in Table 1. Also summarized below in Table 1 are (i) the oxygen produced by each of the propellants in (a) moles, and (b) grams, and (ii) the % reduction in oxygen required to complete combustion of the propellants of the present invention as compared to the amount of oxygen required to complete combustion of the M-39 LOVA propellant.

TABLE I

OXIDIZER MODIFIED LOVA PROPELLANTS FOR AUGMENTED INFLATORS

| Propellant Ingredients | M-39 LOVA | OML 1 | OML 2 | OML 3 | OML 4 | OML 5 | OML 6 | OML 7 | OML 8 | OML 9 | OML 13 | OML 14 | OML 15 | OML 16 |
|---|---|---|---|---|---|---|---|---|---|---|---|---|---|---|
| Cyclotrimethylenetrinitramine (RDX) | 76 | 66 | 46 | 66 | 56 | 46 | 50.4 | 66 | 46 | 50.4 | 50 | 50 | 60 | 50 |
| Cellulose Acetate Butyrate (CAB) | 12 | 12 | 12 | 12 | 12 | 12 | 12 | 12 | 12 | 12 | 12 | 12 | 12 | 12 |
| Tributylcitrate (TBC) or Acetyltriethylcitrate (ATEC) | 7.6 | 7.6 | 7.6 | 7.6 | 7.6 | 7.6 | 7.6 | 7.6 | 7.6 | 7.6 | 7.6 | 7.6 | 7.6 | 7.6 |
| Nitrocellulose (NC) | 4 | 4 | 4 | 4 | 4 | 4 | 0 | 4 | 4 | 0 | 0 | 0 | 0 | 0 |
| Ethyl Centralite (EC) | 0.4 | 0.4 | 0.4 | 0.4 | 0.4 | 0.4 | 0 | 0.4 | 0.4 | 0 | 0.4 | 0.4 | 0.4 | 0.4 |
| Potassium Perchlorate (KP) | | 10 | 30 | | | | | | | | 30 | | 10 | 10 |
| Potassium Nitrate (KN) | | | | 10 | 20 | 30 | 30 | | | | | 15 | 10 | 10 |
| Ammonium Perchlorate (AP) | | | | | | | | 10 | 30 | 30 | | 15 | | 10 |
| TOTAL | 100 | 100 | 100 | 100 | 100 | 100 | 100 | 100 | 100 | 100 | 100 | 100 | 100 | 100 |

TABLE I-continued

OXIDIZER MODIFIED LOVA PROPELLANTS FOR AUGMENTED INFLATORS

| Propellant Ingredients | M-39 LOVA | OML 1 | OML 2 | OML 3 | OML 4 | OML 5 | OML 6 | OML 7 | OML 8 | OML 9 | OML 13 | OML 14 | OML 15 | OML 16 |
|---|---|---|---|---|---|---|---|---|---|---|---|---|---|---|
| Oxygen Produced ($O_2$ m moles) | 0.00 | 12.99 | 38.96 | 11.13 | 22.26 | 33.38 | 33.38 | 9.57 | 28.72 | 28.72 | 38.96 | 31.05 | 24.11 | 33.69 |
| Oxygen Produced (grams) | 0.000 | 0.416 | 1.247 | 0.356 | 0.712 | 1.068 | 1.068 | 0.306 | 0.919 | 0.919 | 1.247 | 0.994 | 0.772 | 1.078 |
| Reduction in Oxygen Required (%) | 0.0 | 10.8 | 32.4 | 9.3 | 18.5 | 27.8 | 27.8 | 8.0 | 23.9 | 23.9 | 32.4 | 25.8 | 20.1 | 28.0 |

As can be seen in Table 1, the prior art propellant M-39 OVA does not have any oxidizer material and thus, does not produce any oxygen when combusted. As such, the M-39 LOVA propellant requires a substantial amount of oxygen gas to be present to combust completely.

Each of the OML 1 through OML 16 propellants has between 10% to 30% of an oxidizer material (i.e., potassium perchlorate, potassium nitrate, or ammonium perchlorate). The oxidizer materials produce between 9.57 millimoles (0.306 grams) to 38.96 millimoles (1.247 grams) of oxygen. This results in an 8% to 32.4% reduction in oxygen required for the propellants of the present invention to combust completely as compared to the amount of oxygen required to combust completely the M-39 LOVA propellant. This reduction in oxygen can reduce the amount (i.e., volume) of stored oxygen in the container, thus resulting in a smaller, lighter and more economical inflator.

A comparison of OML 3, OML 5, and OML 8 illustrates that potassium perchlorate produces more oxygen per quantity than either potassium nitrate or ammonium perchlorate. As such, potassium perchlorate is the preferred solid oxidizer material of the present invention.

The burn rates and ignition times of the OML 13 propellant of the present invention and prior art propellants were measured in a 200 cubic centimeter (cc) closed bomb. The closed bomb contains ambient air at atmospheric pressure. Each of the propellants tested weighed 10 grams. The OMLOVA- 20% AN (ammonium nitrate) propellant comprises on a weight basis 56% RDX, 12% CAB, 7.6% TBC or ATEC, 4% NC, 0.4% EC and 20% AN (ammonium nitrate). The OMLOVA-10% AN (ammonium nitrate) propellant comprises on a weight basis 66% RDX, 12% CAB, 7.6% TBC or ATEC, 4% NC, 0.4% EC and 10% AN.

The OML 13 propellant was ignited with 1 gram of black powder. The prior art propellants each required 2 grams of black powder to be ignited. A 1 gram black powder igniter charge could not reliably ignite the prior art propellants. The ignition time of each of the propellants was measured in milliseconds. The ignition time is the time required for the propellant to produce a pressure in the bomb of 6.9 MPa. The burn rate of each of the propellants was measured in centimeters per second at pressures of 24 MPa and 32 MPa. The results of the test are summarized below in Table II.

TABLE II

COMPARISON OF OMLOVA CLOSED BOMB COMBUSTION TESTS

| Combustion Tests | OML 13 | OMLOVA - 20% AN | OMLOVA - 10% AN |
|---|---|---|---|
| Burn Rate at 24 MPa (cm/sec) | 1.86 | 0.82 | 0.52 |
| Burn Rate at 32 MPa (cm/sec) | 2.66 | 0.91 | 0.71 |
| Ignition Time (msec)* | 35 | 55 | 52 |

*Time to reach 6.9 MPa

Figure 5:
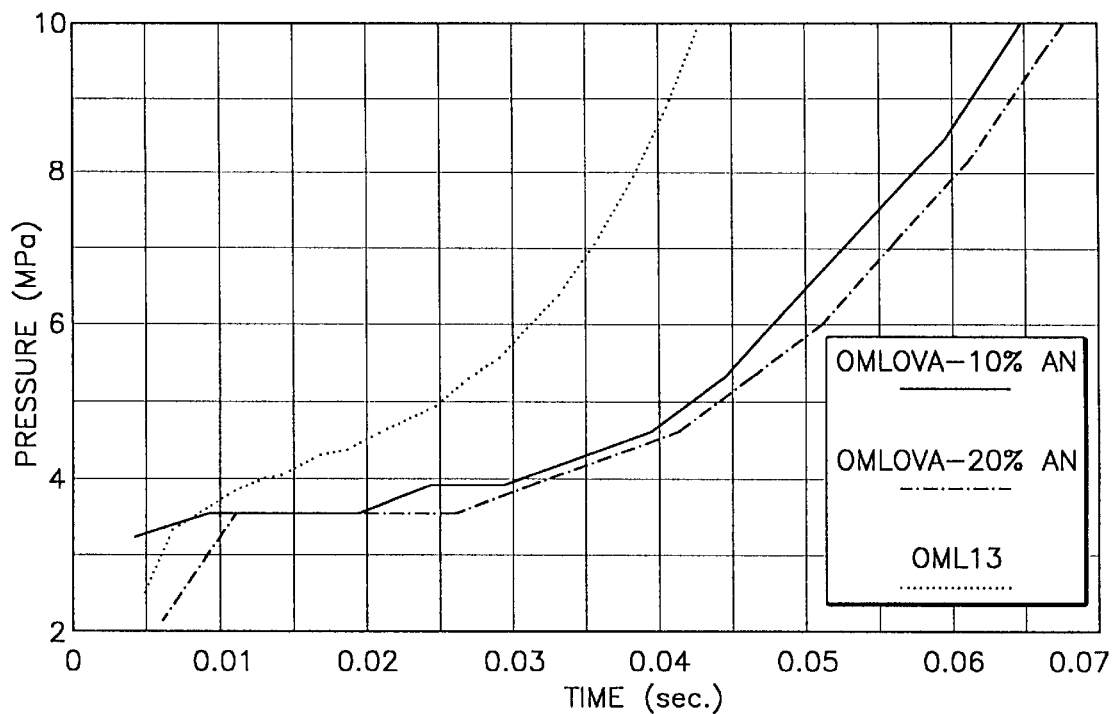
FIG. 5 is a graph showing the rate of increase in pressure resulting from combustion of a propellant of the present invention and two prior art propellants.

As can be seen in Table II, the ignition time for the OMLOVA-20% AN and OMLOVA-10% AN propellants are almost twice as long as the ignition time of the propellant of the present invention. The pressure inside the closed bomb at different times are plotted in FIG. 5. The ignition times for the prior art ammonium nitrate propellants are too high for practical application in an air bag inflator. The prior art ammonium nitrate propellants also required an igniter charge which is twice as big as the igniter charge for the OML 13 propellant of the present invention.

As can be seen in Table II, the ignition time for the prior art ammonium nitrate propellants increases as the amount of ammonium nitrate increases. Prior art propellants with 30% ammonium nitrate were tested, but they proved to be impractical for use in an air bag inflator. The 30% ammonium nitrate propellants had extremely long ignition times and in many instances were not ignitable.

Figure 6:
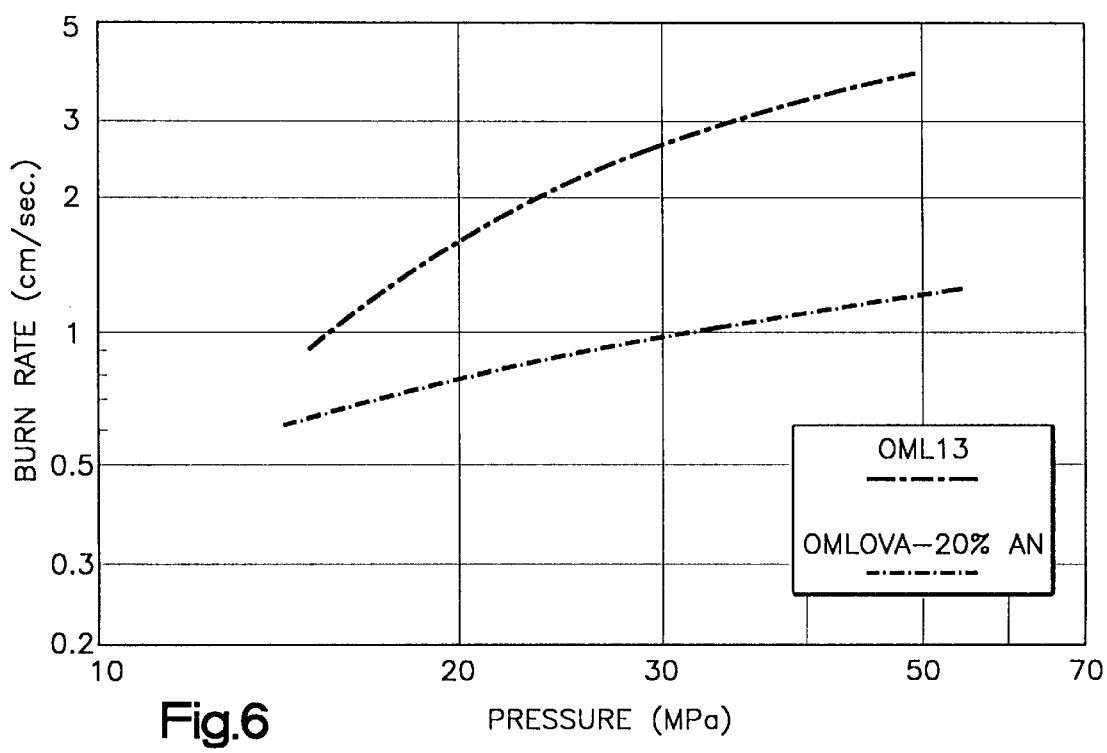
FIG. 6 is a graph showing the burn rate at differing pressures of a propellant of the present invention and a prior art propellant.

In addition to their long ignition times, the burn rates of the prior art ammonium nitrate propellants are too slow for practical application in an air bag inflator. The burn rate at 24 MPa for the OML 13 propellant of the present invention is about 2.3 times faster than the OMLOVA-20% AN propellant and about 3.6 times faster than the OMLOVA-10% AN propellant. The burn rate at 32 MPa for the OML 13 propellant of the present invention is about 2.9 times faster than the OMLOVA-20% AN propellant and about 3.8 times faster than the OMLOVA-10% AN propellant. The burn rates of the OML 13 propellant and the OMLOVA-20% AN propellant at different pressures in the closed bomb are plotted in FIG. 6.

The toxic effluent gases produced upon combustion of two different prior art propellants and propellants of the present invention were also measured in parts per million in a 60 liter tank test. The composition of each of the propellants tested can be found in Table I with the exception of the GAP LOVA propellant. The GAP LOVA propellant comprises on a weight basis 76% RDX, 12% CAB, and 12% GAP (glycidyl azide polymer). Each of the propellants tested were fired in an inflator having a configuration similar to that of FIG. 1 and filled with a gas having a composition, on a weight basis, of about 75% argon, about 20% oxygen and about 5% helium and stored at a pressure of about 3500 psi. The gases produced upon combustion of the propellants were allowed to flow into a 60 liter tank and were measured. The results of the 60 liter tank test are summarized below in Table III. Also illustrated in Table III is a standard automobile manufacturer's passenger specification for the 60 liter tank test in parts per million and the lethal concentration $(LC)_{50}$ levels for a vehicle occupant exposed to the listed gases in a standard sized vehicle compartment for at least 30 minutes.

duced effluent gas levels lower than the $LC_{50}$ level for all of the effluent gases tested.

Also, the toxic effluent gas levels from low fill pressure inflators loaded with OML 2, M-39 LOVA and GAP LOVA propellants were measured in a 100 cubic foot tank test. The 100 cubic foot tank is essentially equivalent to the size of a standard automobile passenger compartment. Each of the propellants tested was fired in an inflator having a configuration similar to that of FIG. 1 and filled with a gas having

TABLE III

COMPARISON OF EFFLUENTS FROM OMLOVA PROPELLANT WITH OTHER LOVA PROPELLANTS
(60 Liter Tank Tests)

| Propellant Type | Description | Propellant wt./Gas wt. (g/g) | CO | NO | NO2 | HCN | HCOH |
|---|---|---|---|---|---|---|---|
| Standard Passenger Specification for 60-Liter Tank (ppm max). | | | 9320 | 932 | 466 | 234 | 280 |
| Standard $LC_{(50)}$ for 30 min Exposure (ppm) | | | 5550 | 320 | 250 | 170 | 82 |
| M-39 LOVA | LOVA M-39 (76% RDX) | 6.675/100.4 | 6597 | 205 | 601 | 152 | 16 |
| OML 2 | OMLOVA with 30% KP | 9.5/124 | 1012 | 164 | 246 | 3 | 1 |
| OML 5 | OMLOVA with 30% KN | 9.5/117.4 | 646 | 123 | 85 | 2 | 1 |
| OML 6 | OMLOVA with 30% KN & 0% NC | 9.5/117.4 | 596 | 143 | 85 | 2 | 1 |
| OML 4 | OMLOVA with 20% KN | 9.5/117.4 | 709 | 132 | 163 | 3 | 1 |
| 50% OML 2 + 50% OML 5 | OMLOVA with 30% KN/30% KP | 9.5/117.4 | 699 | 143 | 168 | 2 | 1 |
| OML 3 | OMLOVA with 10% KN | 9.5/117.4 | 1023 | 149 | 178 | 7 | 2 |
| GAP LOVA | LOVA with 12% GAP | 6.75/107.3 | 3084 | 128 | 289 | 79 | 4 |

KP = Potassium Perchlorate; KN = Potassium Nitrate; NC = Nitrocellulose; GAP = Glycidyl Azide Polymer The M-39 LOVA and the GAP LOVA propellants produced carbon monoxide levels at least 6.5 to 11 times higher, and at least 3 to 5 times higher, respectively, than the levels produced by the propellants of the present invention. The M-39 LOVA and the GAP LOVA propellants also produced hydrogen cyanide (HCN) levels at least 21 to 76 times higher, and at least 11 to 40 times higher, respectively, than the levels produced by the propellants of the present invention. The M-39 LOVA and the GAP LOVA propellants also produced formaldehyde levels at least 8 to 16 times higher, and at least 2 to 4 times higher, respectively, than the levels produced by the propellants of the present invention. The M-39 LOVA and the GAP LOVA propellants produced nitrogen dioxide levels at least 2.4 to 7 times higher, and at least 1.2 to 3.4 times higher, respectively, than the levels produced by the propellants of the present invention.

Also, the M-39 LOVA and the GAP LOVA propellants both produced nitrogen dioxide levels in excess of the $LC_{50}$ level. All of the propellants of the present invention proa composition, on a weight basis, of about 75% argon, about 20% oxygen and about 5% helium and stored at a pressure of about 1,000 psi. This is significantly less than the typical pressure of an air bag inflator, which is about 3,500 psi. A pressure of about 1,000 psi is illustrative of the pressure inside an air bag inflator with a gas leak. An inflator at a pressure of about 1,000 psi, because of the lower pressure and smaller amount of oxygen, does not support combustion of a propellant as well as an inflator at higher pressures. Thus, the 100 cubic foot tank test shows the effects of incomplete combustion in a prior art LOVA type gas generating propellant and propellants of the present invention in an inflator with less than ideal pressure. The results of the 100 cubic feet low pressure tank test are summarized below in Table IV. Also illustrated in Table IV is a standard automobile manufacturer's passenger specification at typical pressures (i.e., 3500 psi) for the 100 cubic foot tank test in parts per million.

TABLE IV

COMPARISON OF EFFLUENTS FROM OMLOVA PROPELLANT IN
LOW FILL-PRESSURE INFLATORS (100 cu. Ft. Tank Tests)

| Propellant Type | Description | Propellant wt./Gas wt. (g/g) | CO | NO | NO2 | HCN | HCOH |
|---|---|---|---|---|---|---|---|
| Standard Passenger Specification for 100 cubic feet Tank (ppm max.) | | | 200 | 20 | 10 | 5 | 6 |
| | | Effluent per Inflator (ppm/Infl.) | | | | | |
| M-39 LOVA | LOVA M-39 | 9/32.6 | 5911 | 74 | 175 | 52 | 4 |
| OML 2 | OMLOVA with 30% KP | 10/31.8 | 449 | 5 | 3 | 2 | 1 |
| GAP LOVA | LOVA with 12% GAP | 7.24/31.80 | 325 | 43 | 75 | 24 | 1 |
| | | Effluent per Mass of Propellant (ppm/g.) | | | | | |
| M-39 LOVA | LOVA M-39 | — | 656.8 | 8.2 | 19.4 | 5.8 | 0.4 |

TABLE IV-continued

COMPARISON OF EFFLUENTS FROM OMLOVA PROPELLANT IN
LOW FILL-PRESSURE INFLATORS (100 cu. Ft. Tank Tests)

| Propellant Type | Description | Propellant wt./Gas wt. (g/g) | CO | NO | NO2 | HCN | HCOH |
|---|---|---|---|---|---|---|---|
| OML 2 | OMLOVA with 30% KP | — | 44.9 | 0.8 | 0.3 | 0.2 | 0.1 |
| GAP LOVA | LOVA WITH 12% GAP | — | 44.9 | 5.9 | 10.5 | 3.3 | 0.1 |

As shown in Table IV, the OML2 propellant produced lower levels per gram of propellant of nitric oxide, nitrogen dioxide, hydrogen cyanide than the M-39 LOVA and the GAP LOVA propellants. Moreover, the OML2 propellant produced lower levels per gram of propellant of carbon monoxide and formaldehyde than the M-39 propellant. Also, as can be seen in Table IV, the OML2 propellant produced, on a per gram basis, levels of carbon monoxide and formaldehyde equal to the GAP LOVA propellant. Moreover, it should be noted that even at the lower inflator pressure of 1,000 psi, the OML 2 propellant produced levels of nitric oxide, nitrogen dioxide, hydrogen cyanide, and formaldehyde within the industry standard for effluents produced in an inflator fired at 3500 psi.

Thus, as the above examples illustrate, the propellants of the present invention produce more oxygen than the prior art propellants, and thus require less stored oxygen to combust completely. The propellants of the present invention also have significantly improved burn rates in comparison to prior art propellants. The shock wave output of propellants of the present invention and prior art M-39 propellant were compared in the TNT equivalency test. The propellants of the present invention produced a shock wave output which was about 50% of the shock wave output produced by the prior art M-39 propellant. Furthermore, the propellants of the present invention, when fired in an inflator of the present invention, has improved toxic effluent levels in comparison to the prior art inflators.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in inflating a vehicle occupant protection device, said apparatus comprising:
   1) a first container for storing a supply of gas;
   2) a gas stored in said first container, said gas comprising an inert gas and oxygen;
   3) a second container;
   4) a combustible material in said second container, said combustible material consisting essentially of:
      (a) about 36% to about 76% by weight, based on the weight of said combustible material, excluding inert components, of a non-metallic nitrogen containing compound selected from the group consisting of nitroguanidine, triaminoguanidine nitrate, ethylene dinitramine, ethylenediamine dinitrate, 1,3,3-trinitroazetidine, cyclotrimethylenetrinitramine, cyclotetramethylenetetranitramine, trinitrotoluene, 2,4,6-trinitrophenylmethylnitramine, pentaerythritol tetranitrate and mixtures thereof;
      (b) about 8% to about 22% by weight, based on the weight of said combustible material, excluding inert components, of a binder selected from the group consisting of cellulose acetate butyrate, cellulose acetate, polyester elastomer, polyether elastomer, polyurethane, and copolymers thereof; and
      (c) about 10% to about 40% by weight, based on the weight of said combustible material, excluding inert components, of an oxidizer material selected from the group consisting of ammonium perchlorate, potassium perchlorate, potassium nitrate, and combinations thereof;
   5) igniter means for igniting said combustible material, said combustible material when ignited generating an initial combustion product;
   6) means for directing said initial combustion product directly from said second container into said first container, said initial combustion product further combusting in the presence of said oxygen and generating a final non-toxic combustion product including heat for heating said inert gas; and
   7) a conduit for directing said heated inert gas and said final non-toxic combustion product to the vehicle occupant protection device;
   the combined weights of oxygen from said stored gas and oxygen from said oxidizer material being effective to produce a final non-toxic combustion product essentially free of carbon monoxide.

2. The apparatus of claim 1 wherein said combustible material further consists essentially of a plasticizer.

3. The apparatus of claim 2 wherein said plasticizer is selected from the group consisting of tributylcitrate, acetyltriethylcitrate, or acetyltributylcitrate.

4. The apparatus of claim 2 wherein said plasticizer is selected from the group consisting glycidyl azide polymer, bis-nitropropylformal, 1-5-diazido-3-nitrazapentane, alkylnitratoethylnitramine wherein alkyl is methyl, ethyl, propyl, or butyl.

5. The apparatus of claim 3 wherein said combustible material further consists essentially an energetic plasticizer selected from the group consisting glycidyl azide polymer, bis-nitropropylformal, 1-5-diazido-3-nitrazapentanealkyl, alkylnitratoethylnitramine wherein alkyl is methyl, ethyl, propyl, or butyl.

6. The apparatus of claim 1 wherein said inert gas is selected from the group consisting of helium, argon, and mixtures thereof.

7. The apparatus of claim 6 wherein said thermoplastic binder is cellulose acetate butyrate.

8. The apparatus of claim 6 wherein said non-metallic nitrogen containing compound is cyclotrimethylenetrinitramine.

9. The apparatus of claim 8 wherein said gas comprises on a weight basis, helium in an amount of about 1% to about 5%, oxygen in an amount of about 10% to about 25% with the balance being made up of argon.

10. The apparatus of claim 9 wherein said gas comprises, on a weight basis, about 75% to about 85% argon, about 10% to about 20% oxygen, and about 5% helium.

11. The apparatus of claim 10 wherein said cyclotrimethylenetrinitramine is present an amount of about 36% to about 49% by weight based on the weight of said combustible material, excluding inert components.

12. The apparatus of claim 1 wherein said oxidizer material is potassium perchlorate.

13. An apparatus for use in inflating a vehicle occupant protection device, said apparatus comprising 1) a first container for storing a supply of gas;
2) a second container;
3) a combustible material in said second container, said combustible material consisting essentially of:
   (a) about 36% to about 76% by weight, based on the weight of said combustible material, excluding inert components, of a non-metallic nitrogen containing compound selected from the group consisting of nitroguanidine, triaminoguanidine nitrate, ethylene dinitramine, ethylenediamine dinitrate, 1,3,3-trinitroazetidine, cyclotrimethylenetrinitramine, cyclotetramethylenetetranitramine, trinitrotoluene, 2,4,6-trinitrophenylmethylnitramine, pentaerythritol tetranitrate and mixtures thereof;
   (b) about 8% to about 22% by weight, based on the weight of said combustible material, excluding inert components, of a binder selected from the group consisting of cellulose acetate butyrate, cellulose acetate, polyester elastomer, polyether elastomer, polyurethane, and copolymers thereof; and
   (c) about 10% to about 40% by weight, based on the weight of said combustible material, excluding inert components, of an oxidizer material selected from the group consisting of ammonium perchlorate, potassium perchlorate, potassium nitrate, and combinations thereof;
4) a gas stored in said first container, said gas comprising an inert gas and oxygen;
5) igniter means for igniting said combustible material, said combustible material, when ignited generating an initial combustion product;
6) means for directing said initial combustion product from said second container directly into said first container, said initial combustion product further combusting in the presence of said oxygen; the combined weights of oxygen from said stored gas and oxygen from said oxidizer material being effective to produce a final combustion product essentially free of carbon monoxide; and
7) a conduit for directing said heated inert gas and said final combustion product to the vehicle occupant protection device.

14. A method for inflating a vehicle occupant protection device, said method comprising the steps of:

1) providing a first container for storing a supply of gas;
2) storing a gas in said first container, said gas comprising an inert gas and oxygen;
3) providing a second container;
4) providing a combustible material in said second container, said combustible material consisting essentially of:
   (a) about 36% to about 76% by weight, based on the weight of said combustible material, excluding inert components, of a non-metallic nitrogen containing compound selected from the group consisting of nitroguanidine, triaminoguanidine nitrate, ethylene dinitramine, ethylenediamine dinitrate, 1,3,3-trinitroazetidine, cyclotrimethylenetrinitramine, cyclotetramethylenetetranitramine, trinitrotoluene, 2,4,6-trinitrophenylmethylnitramine, pentaerythritol tetranitrate and mixtures thereof;
   (b) about 8% to about 22% by weight, based on the weight of said combustible material, excluding inert components, of a binder selected from the group consisting of cellulose acetate butyrate, cellulose acetate, polyester elastomer, polyether elastomer, polyurethane, and copolymers thereof; and
   (c) about 10% to about 40% by weight, based on the weight of said combustible material, excluding inert components, of an oxidizer material selected from the group consisting of ammonium perchlorate, potassium perchlorate, potassium nitrate, and combinations thereof;
5) igniting said combustible material, said combustible material, when ignited generating an initial combustion product;
6) directing said initial combustion product from said second container directly into said first container, said initial combustion product further combusting in the presence of said oxygen and generating a final non-toxic combustion product including heat for heating said inert gas; and
7) directing said heated inert gas and said final non-toxic combustion product toward the vehicle occupant protection device;

the combined weights of oxygen from said stored gas and oxygen from said oxidizer material being effective to produce a final combustion product essentially free of carbon monoxide.

15. The method of claim 14 wherein said non-metallic nitrogen containing compound is cyclotrimethylenetrinitramine.

16. The method of claim 15 wherein said stored gas comprises on a weight basis, helium in an amount of about 1% to about 5%, oxygen in an amount of about 10% to about 25% with the balance being made up of argon.

17. The apparatus of claim 1 wherein said combustible material further consists essentially of up to 12% plasticizer based on the weight of the combustible material.

18. The apparatus of claim 17 wherein said plasticizer is energetic.

* * * * *